United States Patent [19]

Hescher et al.

[11] Patent Number: 4,649,443
[45] Date of Patent: Mar. 10, 1987

[54] METHOD OF PRECISE MANUFACTURING OF A TAPE-SCANNING DEVICE FOR OBLIQUE TRACK MAGNETIC RECORDING-REPRODUCING APPARATUS

[75] Inventors: Manfred Hescher, Weiterstadt; Heinrich Rosignol, Rossdorf, both of Fed. Rep. of Germany

[73] Assignee: Robert Bosch GmbH, Stuttgart, Fed. Rep. of Germany

[21] Appl. No.: 605,682

[22] Filed: Apr. 30, 1984

[30] Foreign Application Priority Data

Apr. 30, 1983 [DE] Fed. Rep. of Germany ....... 3355844

[51] Int. Cl.$^4$ .............................................. G11B 5/027
[52] U.S. Cl. ................................. 360/84; 360/130.22; 360/130.24
[58] Field of Search ...................... 360/84, 85, 130.22, 360/130.23, 130.24

[56] References Cited

U.S. PATENT DOCUMENTS 3,516,146  6/1970  Maxey ................................ 360/84 X
4,200,895  4/1980  Repp .
4,366,516 12/1982  Ogata ................................... 360/84
4,369,473  1/1983  Eibensteiner ..................... 360/84 X

FOREIGN PATENT DOCUMENTS 1930779  6/1969  Fed. Rep. of Germany .
2510166  3/1975  Fed. Rep. of Germany .
2713582  3/1977  Fed. Rep. of Germany .

Primary Examiner—A. J. Heinz
Attorney, Agent, or Firm—Frishauf, Holtz, Goodman & Woodward

[57] ABSTRACT

The elongated drum guide (1), on which the two drum-shaped parts of the drum arrangement around which a magnetic tape is guided in one helical turn are held in place, has pairs of seating ribs running circumferentially in a cylinder-arc cavity for seating the two drum parts in the proper alignment and at the proper spacing from each other to allow a head wheel to revolve in the slot between the parts (2, 3) Screws (20) pass through the drum guide (1) and through the seating ribs for holding the drum parts in place in such a way as to provide no strains producing long-term deformation, while at the same time assuring precision of reassembly after demounting the scanning device for replacing the magnet heads of the head wheel. The drum guide is made of a light metal alloy and the seating surfaces of the internal ribs are machined by electric spark erosion to provide the necessary precision and also a hardening of the surface.

1 Claim, 3 Drawing Figures

METHOD OF PRECISE MANUFACTURING OF A TAPE-SCANNING DEVICE FOR OBLIQUE TRACK MAGNETIC RECORDING-REPRODUCING APPARATUS

The invention concerns a scanning device for scanning a magnetic tape by the oblique track method of the kind using a stationary guide drum transversely divided into drum shaped parts for guiding a magnetic tape helically around for a little less than one turn, a revolving head wheel disposed in a slot of the transversely divided drum and having at least two magnet heads thereon for scanning the tape running obliquely across the scanning path of the head and also an elongated drum guide for fixing the position and orientation of the two drum parts.

In contrast to the apparatus for recording sound megnetically in which a relatively narrow magnetic tape is passed in moving contact with one or more stationary magnetic heads systems for the recording of higher frequency signals have generally found favor in which a relatively broad slow-running tape is swept by one or more magnetic heads at an angle to the direction of movement of the tape. The information is accordingly fixed on the tape in a series of parallel finite track sections that run at an angle from one tape edge to the opposite edge.

Along with the apparatus already known for a long while in which the magnetic tape is wrapped cylindrically and is scanned perpendicularly to the direction of movement by a head wheel equipped with two or more magnet heads, systems have come into prevalent use in which the magnetic tape is guided helically about a cylindrical guiding drum and is scanned by a head wheel, revolving in a separation gap of the drum with one or more magnet heads, in oblique tracks. The central angle of the helical wrapping can vary betwen 90 and 360° and according to that variation, the angular postition of the individual densely packed adjacent track sections, with respect to the median line of the tape, can likewise vary.

Among other postulated requirements, the position and angular orientation of the track sections must be the same within very small tolerances for all apparatus of a system, if the requirement of unconditional interchangeability of magnetic tapes without noticeable diminution of quality is to be fulfilled. This is for example the case in the recording and reproduction of television signals in television studios. For fulfilling this requirement the precision of manufacture and assembly of the scanning device has to be very high. The assembly of the two parts of the cylindrical guiding drum and of the tape guiding elements which determine the position of the magnetic tape on the guiding drum, provide important difficulties. The two parts of the guiding drum, in fact, must not only be very precise regarding their geometrical dimensions (with tolerances of a few microns), but the fitting and the angular deviation of the (imaginary) axes in the mounted condition must have at most very small errors, so that the magnetic tape in going over from one drum part to the other will experience no changes of its geometrical shape which could result in a deviation of its scan track from the prescribed shape. As a result of the high scanning speed and the direct contact between tape and head in the recording and reproduction of television signals, the magnet heads of the apparatus used for this purpose undergo a certain wear which requires their replacement, under the present state of the art, after a few hundred hours of operation. It is accordingly desired that the head wheel revolving in the separating gap of the guiding drum part should be readily replaceable, in order that the same degree of precision as is obtained in the initial assembly should be reproducibly obtainable by simple means in reassembly of the scanning device.

A scanning device for recording and reproduction of signals, of the kind described in the first paragraph above is known from German Pat. No. 1 930 779. This known scanning device essentially has an elongated drum guide for a drum arrangement consisting of two parts, with a head wheel mounted rotatably therein. The drum guide contains two plane surfaces of high precision, coming together in V-shape, produced by accurate mechanical machining, which cooperate with the cylindrical surfaces of the two parts of the drum arrangement and are releasably connected thereto. For fulfilling the prescribed requirement of unlimited interchangeability of the magnetic tapes without noticeabe deterioration of quality, at least the surface sections of the drum guide and of the parts of the drum arrangement corresponding to each other, are constituted with the highest precision. In that way, the exact coordiantion of the two parts of the drum arrangment to each other and to the drum guide is intended to be provided even after disassembly and reassembly.

It is further known from German Pat. No. 2 510 166, in order to avoid the necessity of manufacturing highly precise surfaces coming together in V-shape for the drum guide, to provide the drum guide with a lengthwise running rectangular protrusion, in the corners of which cylindrical bodies are set in, which make contact with two surfaces of the rectangular protrusion and the outer surface of the drum parts, in each case along a single contact line. By the use of standard bearing needles with finely stepped manufacturing tolerances, the manufacturing tolerances and the wear of the arrangement as a whole can be in part balancsed out.

It is also known from German Pat. No. 2 713 582, to obtain the required initial precision of the seating surfaces of the drum guide for the drum arrangement by a casting process rather than by mechanical surface treatment. In this case the seating surfaces, after the casting operation protrude above the remaining surfaces which are mechanically machined only relatively coarsely. The great initial precision is intended to persist even with renewed assembly after carrying out disassembly, without tiresome and difficult adjustment work, because of the high dimensional stability of a synthetic resin bearing.

It is common to all solutions of this problem according to the state of the art heretofore that the demountable fastening of the two-part guiding drum is provided by screws which have their median lines in the angular bisector of the central angle between the seating surfaces and the longitudinal axes of the drum arrangement. In that manner, the stressing of the drum guide in cross section resembles that of a carrier on two supports which is bent by the pulling force of the fastening screws. At the same time the drum parts are eliptically deformed. These elastic deformations must then be kept as small as possible by the suitable choice of material and dimensions of the scanning device as a whole, so that the generally desired ease of construction and cost reduction cannot be realized. In addition, the costly precision surface machining of the seating elements in the first two devices stand in the way of economical manufacture. Finally, in the last mentioned device of the heretofore known technology, long-term shape stability problems of the synthetic resin seating members can arise.

SUMMARY OF THE INVENTION

It is an object of the present invention to provide a drum arrangement and drum guide in a tape scanning device in which the parts required to fit precisely together will have good wearing qualities and that corresponding parts not requiring smooth surfaces can be depressed to avoid trouble.

Briefly, a cylindrical hollow is provided in the drum guide and pairs of seating surfaces are provided therein which are spaced from each other, while a set of fastening elements for connecting the drum guide with the drum parts are provided in the region of the seating surfaces. The drum guide has the advantage of being capable of being made of a light metal alloy and to have its surface hardening produced at the same time as its final machining by the spark-erosion process (EDM).

The scanning device of the invention has the advantage that those surfaces of the drum arrangment and of the drum guide which correspond to each other and are made with a roughness profile such that the smallest contaminations could interfere with fitting together are placed in depressed portions of the surface. With the preferred process of machining the surfaces of the parts that still must fit closely together, there is the advantage that hardening is produced so that the surfaces are to a great extent insensitive to scratching effects.

It is particularly advantageous that neither the drum arrangement nor the drum guide can be stressed in bending by the clamping forces of the connecting screws, so that both apparatus weight and cost of manufacture become substantially lower than in the case of scanning devices heretofore available.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
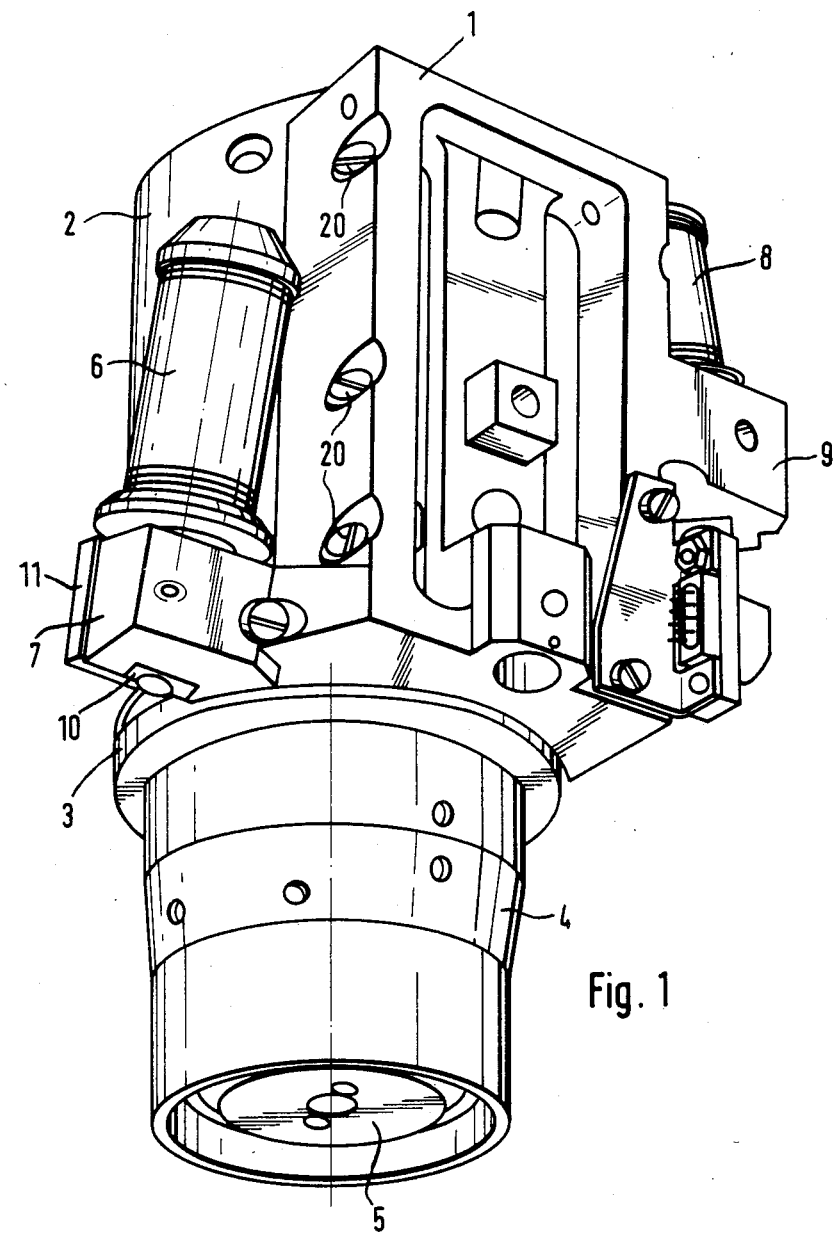
FIG. 1 is a perspective view of a scanning device for an oblique-track magnetic tape for recording and pick-up apparatus.

The drum guide 1 shown in FIG. 1 has a basically rectangular block shape with a hollow along one side in the shape of a cylindrical surface for seating the cylindrical guiding drum parts 2 and 3. The guiding drum part 3 has a cylindrical extension 4 at its bottom side for seating the drive motor 5, which drives a headwheel (not shown) rotating in a transverse gap between the drum parts 2 and 3 during operation of the scanning device.

A tape guide element 6 fixed on a bracket 7 of the drum guide 1 is situated on the lead-in side from which the tape feeds onto the guide drum. On the tape exit side a corresponding tape guide element 8 is fastened on the second bracket 9 of the drum guide 1. The axes of the tape guide elements 6 and 8 intersect each other in space. Their spatial position is determined by the cast-in guide shells, one of which, designated 10 appears in FIG. 1 set in the bracket 7. The position height is thereby so chosen that the magnetic tape can lie helically around the guide drum parts 2 and 3 without overstressing the longitudinal edges of the tape.

Figure 2:
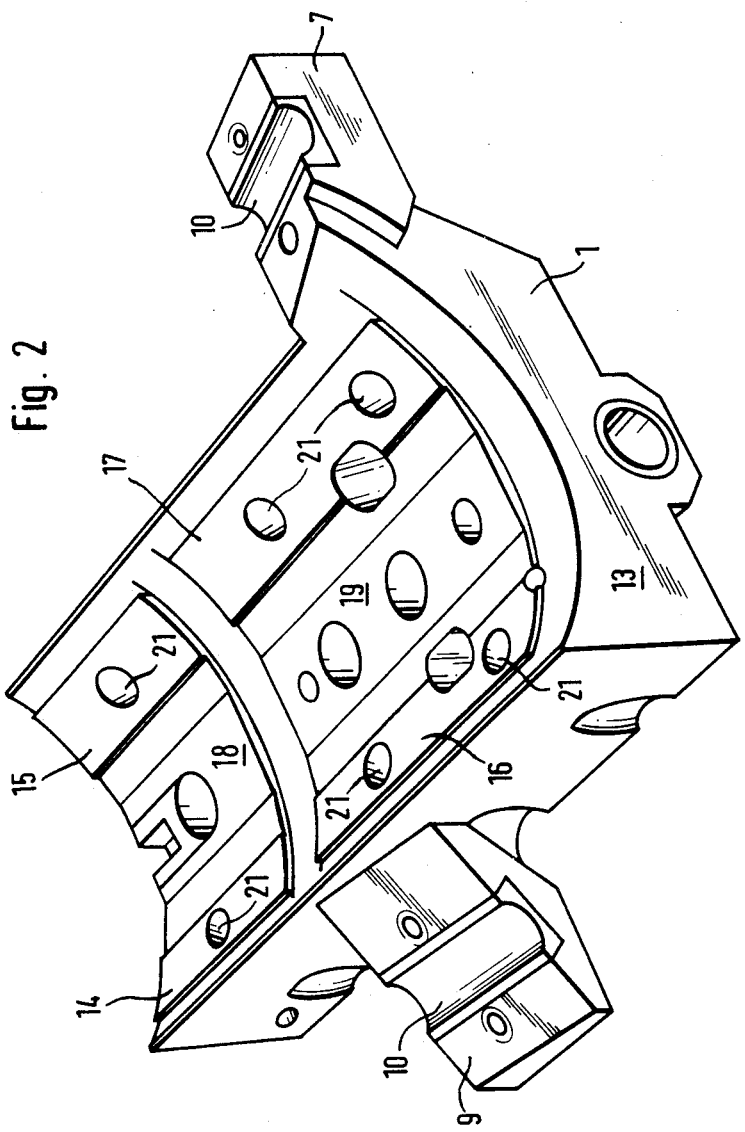
FIG. 2 is a perspective view of the drum guide of the apparatus of FIG. 1.
Figure 3:
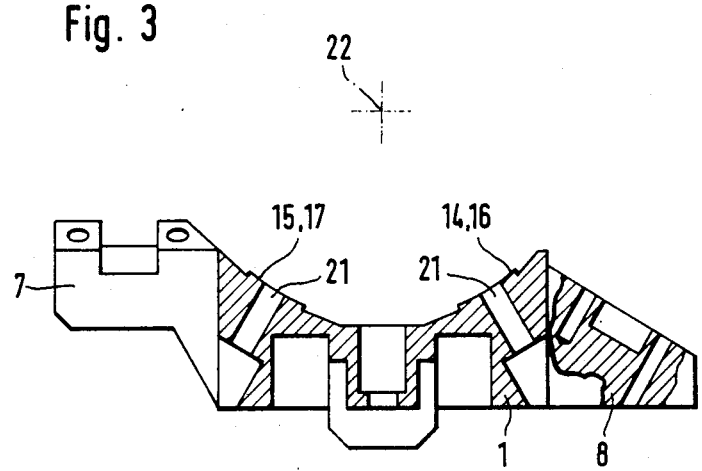
FIG. 3 is a cross-section to the drum guide of FIG. 2.

With the help of clamping pieces, one of which is designated 11, the axes of the tape guide elements 6 and 8 are fixed, fine corrections of the height adjustments being capable of being made from time to time. The structure and assembly of the drum guide 1 will now be explained in more detail with reference to FIGS. 2 and 3. The two brackets 7 and 9 provided at different spacings from the end surface 13 are shown in FIG. 2 at the respective longitudinal sides of the drum guide proper. The two guide shelves 10 serve in each case for the feeding of the axles of the tape guide elements 6 and 8 (FIG. 1).

The cylindrically hollow cavity of the drum guide 1 has two pairs of ribs extending over the prescribed guiding length, the rib pair 14,15 for seating the upper drum and the rib pair 16,17 for seating the lower drum. As can be seen from FIG. 3, the radii of the outer rib surfaces 14,15,16,17 are made slightly smaller than the radii of the surface parts 18 and 19 which surround and extend between the ribs, so that the seating of the guiding drums 2 and 3 takes place merely in the region of the seating surfaces 14,15,16 and 17.

It has been found that mechanical machining by removal of slivers with a cutting tool, in which the work piece, the drum guide 1, would be clamped fast for machining is unsuitable for the required precision of machining of the surface of the seating ribs 14,15,16 and 17 to shape precision of a few microns because the work piece is distorted by clamping forces and such forces are introduced into the work piece by mechanical machining, so that the necessary degrees of precision are obtainable only with difficulty or are not attainable at all. According to the invention, therefore, the drum guide, particularly the seating ribs 14,15,16, and 17 are machined by means of the electric erosion process, sometimes known as electrodynamic machining (EDM). In that process the work piece 1 is precisely mounted relative to a highly precise electrode, the diameter of which corresponds substantially to the future guide drums 2 and 3 and after suitable preliminary machining a precisely measured out electrical discharge is produced which removes material in precisely prescribed regions and within precisely set limits from the drum guide 1. In the case of a drum guide made of a material containing aluminum, a hardening of the surfaces of the seating ribs 14,15,16 and 17 takes place so that the resistance to wear and the reproducability in the case of subsequent disassemblies and reassemblies is substantially improved.

The fastening of the guiding drums 2 and 3 to the drum guide is done on the rear side of the drum guide 1 by means of the screws 20 in radially directed bores 21. The imaginary axes of the bore 21 are all directed to the imaginary central axis 22 of the guiding drums 2 and 3. By the arrangement of the bores 21 for the screws 20 in the seating surfaces 14,15, 16 and 17 and by the radial orientation of the screws 20 and their bores 21 there results a mode of fastening of the guiding drums 2 and 3 of the drum guide 11 which to a great extent is free from bending stresses on the drum guide 1 and distorting forces on the guiding drums 2 and 3.

Although the invention has been disclosed with reference to a particular illustrated example, it will be understood that modifications and variations are possible within the inventive concept.

What is claimed is:

1. Method of making a scanning device for the recording and/or reproducing of broad band signals respectively on and from a magnetic tape by the oblique track method, comprising a stationary guide drum transversely divided into two parts, for guiding a magnetic tape helically therearound about an angle of less than 360°, a revolving head wheel disposed in a slot of the transversely divided drum and having at least two magnetic heads thereon for scanning the tape running obliquely across the scanning path of the heads and an elongated drum guide for fixing the position and orientation of the two drum parts, set method comprising:

making said drum guide (1) of a light metal alloy in a configuration providing a cylindrical hollow for facing said parts (2, 3) of said guide drum (1) with pairs of seating surfaces (14,15; 16,17) provided on said drum guides respectively for said drum part, which pairs are spaced from each other axially, the seating surfaces of each pair being spaced from each other circumferentially;

as a final shaping step for said drum guide, shaping the drum guide at least in a region including said seating surfaces by electric spark erosion, whereby said surfaces and other portions shaped by spark erosion are hardened, and assembling said drum guide with said guide drum parts by means of radial fastening elements (20) fastening said drum guide to said guide drum part, said radial fastening elements passing through said seating elements, whereby said drum parts are firmly seated on said seating elements of said drum guide in portions of said drum parts located outside of said angle of less than 360° around which said magnetic tape is to be guided.

* * * * *